United States Patent
Uchimura et al.

(10) Patent No.: US 11,276,053 B2
(45) Date of Patent: Mar. 15, 2022

(54) INFORMATION PROCESSING SYSTEM, METHOD, AND STORAGE MEDIUM FOR DETECTING A POSITION OF A CUSTOMER, PRODUCT OR CARRIER USED FOR CARRYING THE PRODUCT WHEN THE CUSTOMER APPROACHES A PAYMENT LANE AND DETERMINING WHETHER THE DETECTED POSITION ENABLES ACQUISITION OF IDENTIFICATION INFORMATION FROM THE PRODUCT

(71) Applicant: NEC Corporation, Tokyo (JP)

(72) Inventors: Jun Uchimura, Tokyo (JP); Hiroshi Takahashi, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/981,522

(22) PCT Filed: Mar. 1, 2019

(86) PCT No.: PCT/JP2019/007985
§ 371 (c)(1),
(2) Date: Sep. 16, 2020

(87) PCT Pub. No.: WO2019/181424
PCT Pub. Date: Sep. 26, 2019

(65) Prior Publication Data
US 2021/0012308 A1 Jan. 14, 2021

(30) Foreign Application Priority Data

Mar. 22, 2018 (JP) .............................. JP2018-055052

(51) Int. Cl.
*G06Q 20/20* (2012.01)
*G07G 1/00* (2006.01)
*G07G 1/12* (2006.01)

(52) U.S. Cl.
CPC .......... *G06Q 20/208* (2013.01); *G07G 1/0018* (2013.01); *G07G 1/0036* (2013.01); *G07G 1/12* (2013.01)

(58) Field of Classification Search
CPC .. G07G 1/0018; G07G 1/0036; G07G 1/0045; G07G 1/0054; G07G 1/009; G07G 1/01; G07G 1/12; G06Q 20/208

(Continued)

(56) References Cited

U.S. PATENT DOCUMENTS

2007/0205277 A1 9/2007 Tashiro
2011/0198400 A1 8/2011 Sano (Continued)

FOREIGN PATENT DOCUMENTS

JP 2002-063651 A 2/2002
JP 2007-233828 A 9/2007

(Continued)

OTHER PUBLICATIONS

International Search Report for PCT Application No. PCT/JP2019/007985, dated Apr. 2, 2019.

*Primary Examiner* — Suezu Ellis
(74) *Attorney, Agent, or Firm* — Sughrue Mion, PLLC

(57) ABSTRACT

Provided is an information processing system including: a detection means for detecting a position of a customer, a product, or a carrier used for carrying the product; an acquisition means for acquiring identification information from the product; a determination means for determining whether or not a position detected by the detection means is a position that enables acquisition of the identification information; and a notification information generation means for, when it is determined that the position detected by the detection means is not a position that enables acquisition of the identification information, generating notifica- (Continued)

tion information used for providing a notification to the customer.

19 Claims, 10 Drawing Sheets

(58) Field of Classification Search
USPC .......................................................... 235/383
See application file for complete search history.

(56) References Cited

U.S. PATENT DOCUMENTS

| | | |
|---|---|---|
| 2015/0112825 A1 | 4/2015 | Konishi et al. |
| 2017/0178107 A1 | 6/2017 | Iwamoto et al. |
| 2019/0086545 A1* | 3/2019 | Mooney .................. G01S 17/88 |
| 2021/0012308 A1* | 1/2021 | Uchimura ............ G07G 1/0018 |
| 2021/0042806 A1* | 2/2021 | Uchimura .......... G06Q 30/0281 |

FOREIGN PATENT DOCUMENTS

| | | |
|---|---|---|
| JP | 2011-165140 A | 8/2011 |
| JP | 2013-073296 A | 4/2013 |
| JP | 2015-109061 A | 6/2015 |
| JP | 2015-207116 A | 11/2015 |
| JP | 2016-181100 A | 10/2016 |
| JP | 2017-102749 A | 6/2017 |
| WO | 2015/145977 A1 | 10/2015 |

* cited by examiner

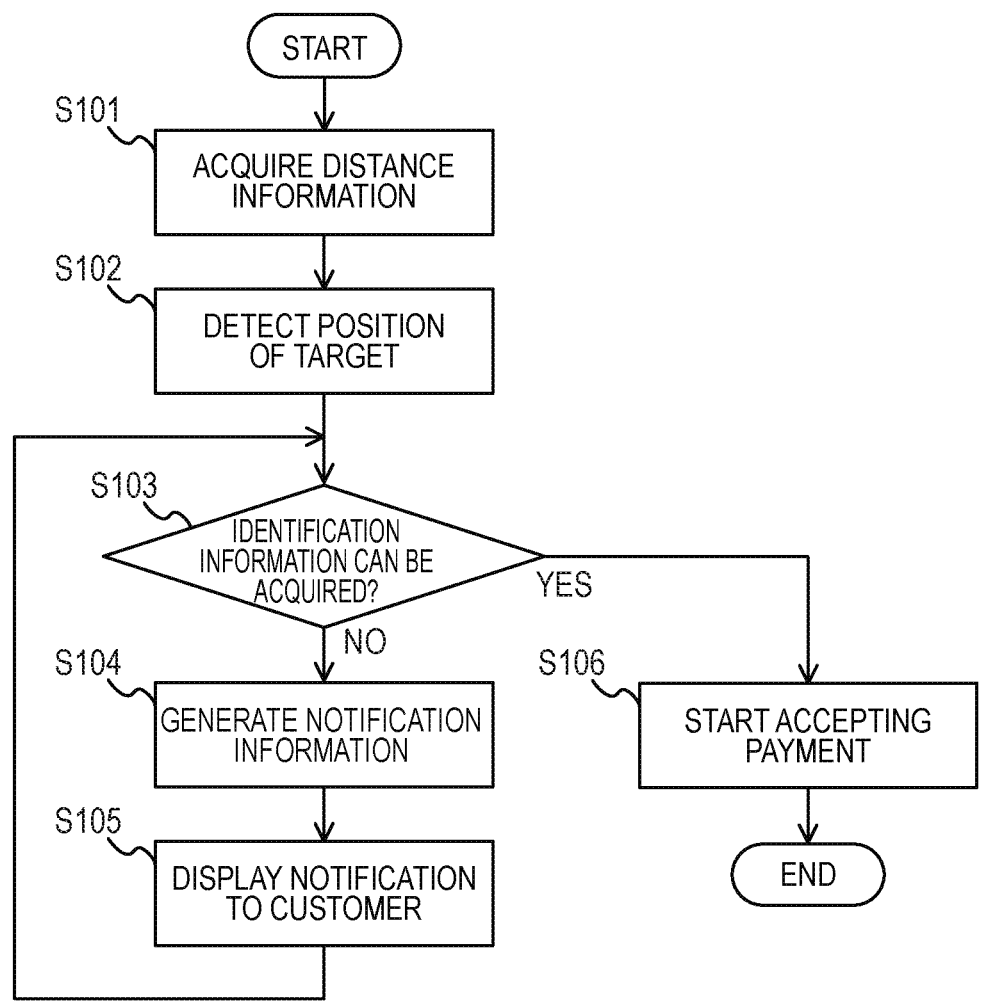

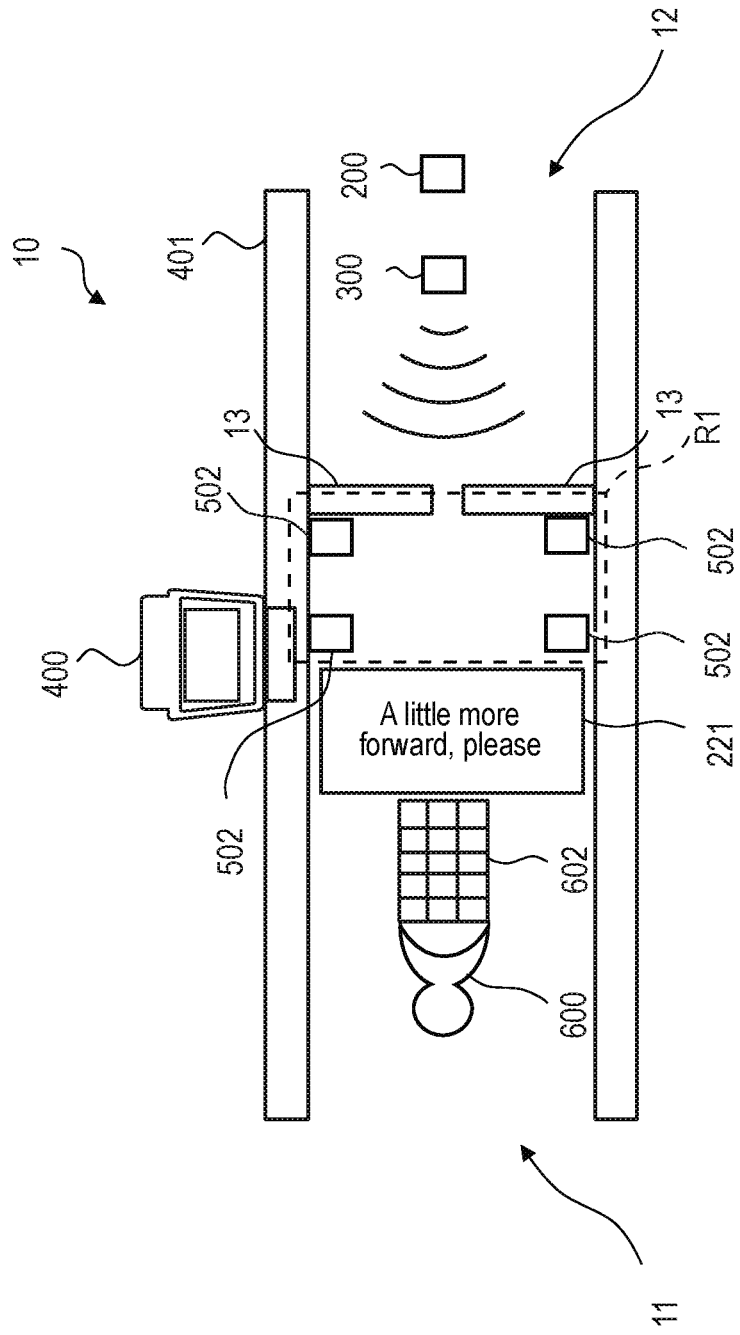

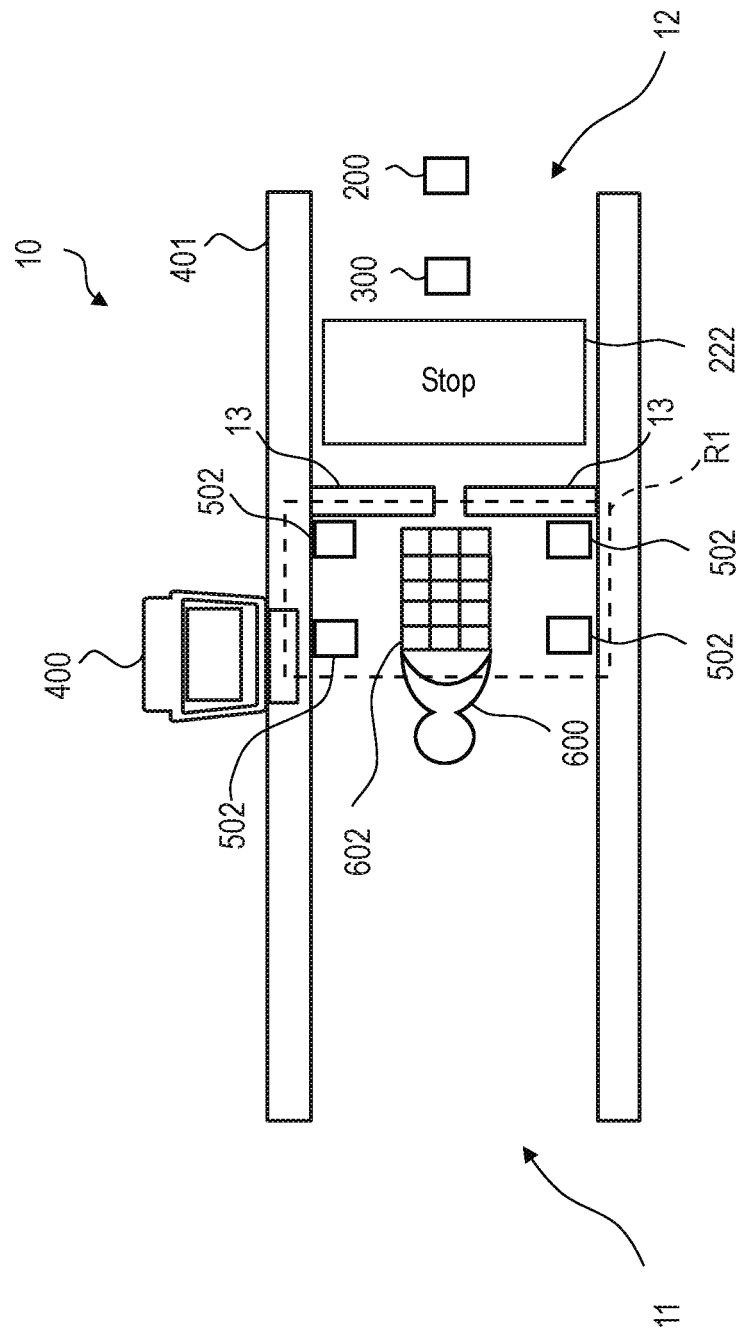

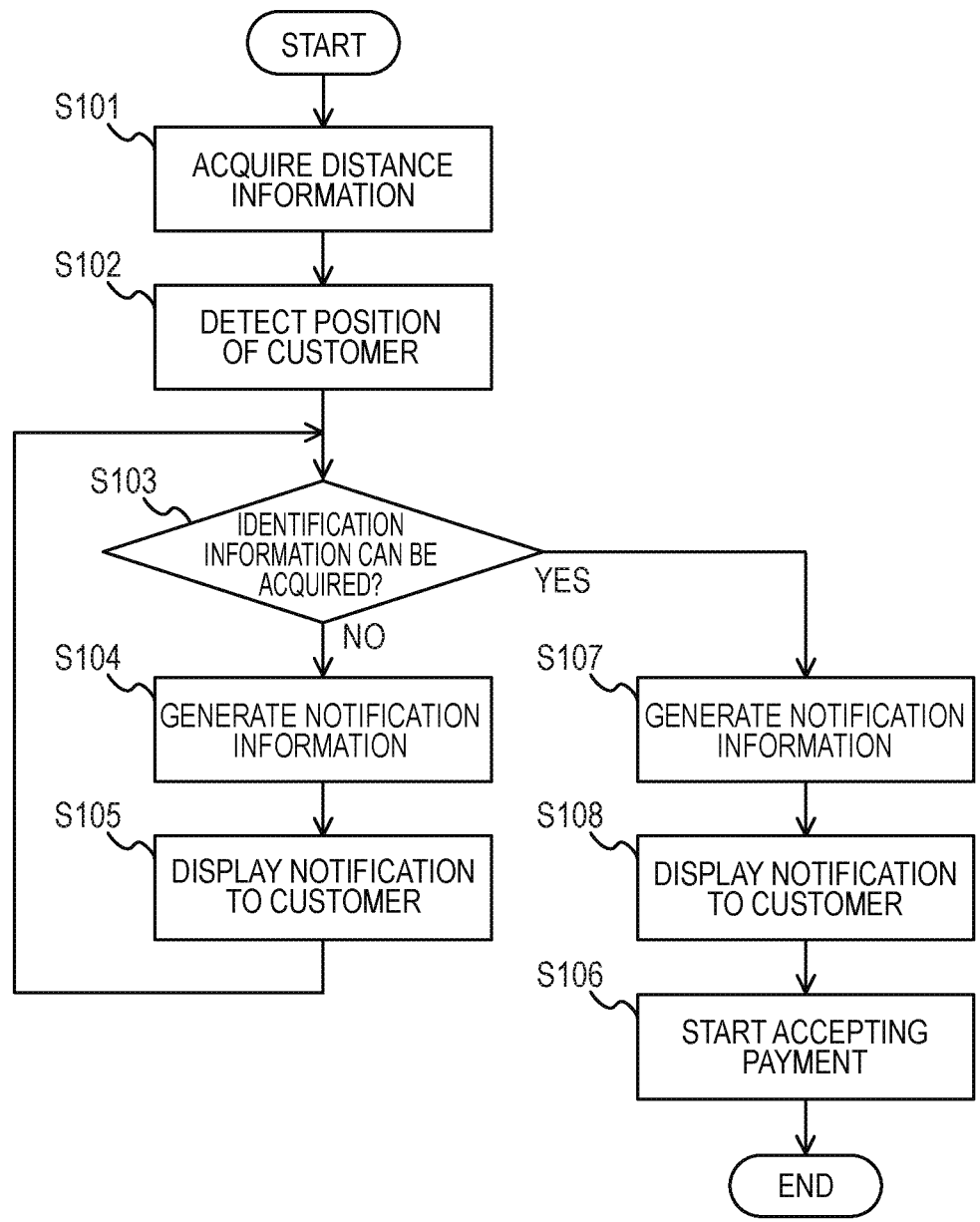

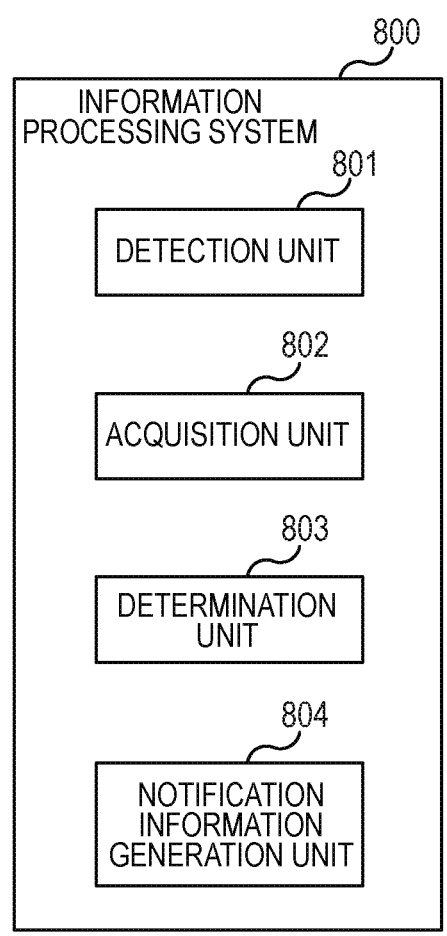

INFORMATION PROCESSING SYSTEM, METHOD, AND STORAGE MEDIUM FOR DETECTING A POSITION OF A CUSTOMER, PRODUCT OR CARRIER USED FOR CARRYING THE PRODUCT WHEN THE CUSTOMER APPROACHES A PAYMENT LANE AND DETERMINING WHETHER THE DETECTED POSITION ENABLES ACQUISITION OF IDENTIFICATION INFORMATION FROM THE PRODUCT

This application is a National Stage Entry of PCT/JP2019/007985 filed on Mar. 1, 2019, which claims priority from Japanese Patent Application 2018-055052 filed on Mar. 22, 2018, the contents of all of which are incorporated herein by reference, in their entirety.

TECHNICAL FIELD

The present invention relates to an information processing system, an information processing method, and a storage medium.

BACKGROUND ART

Patent Literature 1 discloses a self-service checkout terminal that enables a customer to perform self-service checkout. The self-service checkout terminal has a function of displaying, on a screen, an instruction for the customer to perform product registration.

CITATION LIST

Patent Literature

PTL 1: Japanese Patent Application Laid-open No. 2007-233828

SUMMARY OF INVENTION

Technical Problem

In the self-service checkout terminal disclosed in Patent Literature 1, when an instructed customer does not place a product at a suitable position, acquisition of identification information on the product may not be suitably performed.

The present invention has been made in view of the problem described above and intends to provide an information processing system, an information processing method, and a storage medium that can support acquisition of identification information.

Solution to Problem

According to one example aspect of the present invention, provided is an information processing system including: a detection means for detecting a position of a customer, a product, or a carrier used for carrying the product; an acquisition means for acquiring identification information from the product; a determination means for determining whether or not a position detected by the detection means is a position that enables acquisition of the identification information; and a notification information generation means for, when it is determined that the position detected by the detection means is not a position that enables acqui-sition of the identification information, generating notification information used for providing a notification to the customer.

According to another example aspect of the present invention, provided is an information processing method including: detecting a position of a customer, a product, or a carrier used for carrying the product; acquiring identification information from the product; determining whether or not the detected position is a position that enables acquisition of the identification information; and when it is determined that the detected position is not a position that enables acquisition of the identification information, generating notification information used for providing a notification to the customer.

According to another example aspect of the present invention, provided is a storage medium storing a program that causes a computer to perform: detecting a position of a customer, a product, or a carrier used for carrying the product; acquiring identification information from the product; determining whether or not the detected position is a position that enables acquisition of the identification information; and when it is determined that the detected position is not a position that enables acquisition of the identification information, generating notification information used for providing a notification to the customer.

Advantageous Effects of Invention

According to the present invention, it is possible to provide an information processing system, an information processing method, and a storage medium that can support acquisition of identification information.

BRIEF DESCRIPTION OF DRAWINGS

FIG. 6 is a flowchart illustrating an outline of a process performed by the information processing system according to the first example embodiment.

FIG. 7 is a schematic top view illustrating the arrangement in a POS system according to a second example embodiment.

FIG. 8 is a schematic top view illustrating the arrangement in the POS system according to the second example embodiment.

FIG. 9 is a flowchart illustrating an outline of a process performed by an information processing system according to the second example embodiment.

FIG. 10 is a function block diagram of an information processing system according to a third example embodiment.

DESCRIPTION OF EMBODIMENTS

Exemplary example embodiments of the present invention will be described below with reference to the drawings.

First Example Embodiment

Figure 1:
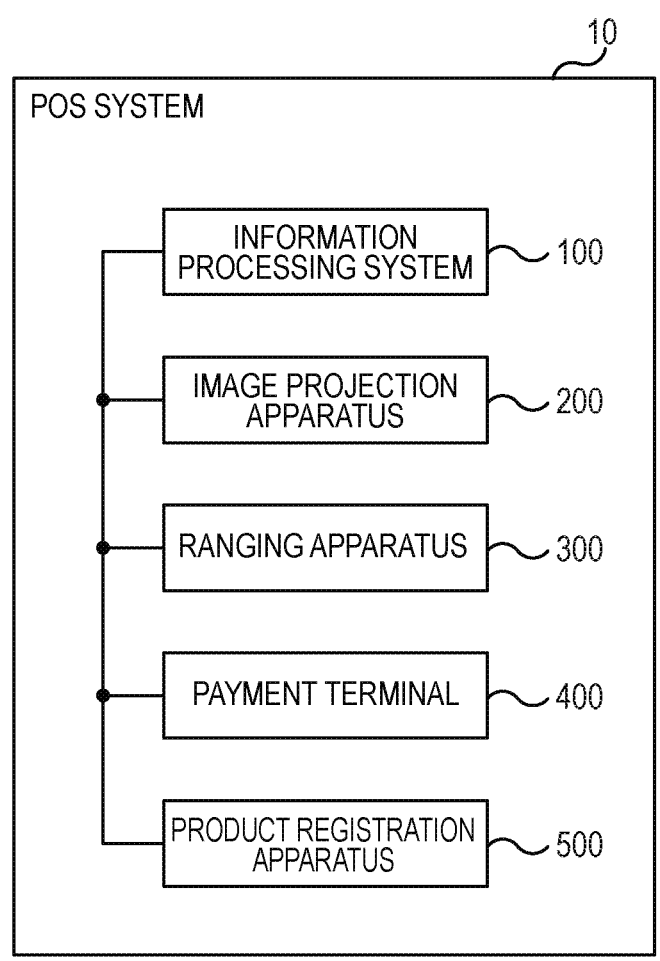
FIG. 1 is a block diagram illustrating a general configuration of a Point Of Sales (POS) system according to a first example embodiment.

FIG. 1 is a block diagram illustrating a general configuration of a POS system 10 according to the present example embodiment. The POS system 10 is a system that performs registration of a product, payment, or the like for sales of a product or the like in a shop. The POS system 10 includes an information processing system 100, an image projection apparatus 200, a ranging apparatus 300, a payment terminal 400, and a product registration apparatus 500. The information processing system 100, the image projection apparatus 200, the ranging apparatus 300, the payment terminal 400, and the product registration apparatus 500 are connected to each other so as to be able to communicate with each other by a wired or wireless manner. Note that the POS system 10 may be used for payment of the price for a provided service.

The information processing system 100 is a computer, for example, and performs processing of control of each apparatus forming the POS system 10, acquisition of information from each apparatus, analysis of acquired information, or the like. The image projection apparatus 200 is an apparatus such as a transmission type liquid crystal projector, a reflection type liquid crystal projector, or the like and displays an image such as a text, a figure, a symbol, a picture, or the like on an object by emitting a light beam.

The ranging apparatus 300 may be an apparatus such as a stereo camera device, a Light Detection and Ranging (LiDAR) device, or the like and can acquire a spatial distribution of the distance from the ranging apparatus 300 to a ranging target.

The payment terminal 400 is an apparatus that accepts payment for purchase of a product or the like. This payment may be payment by cash or may be payment by a credit card, a debit card, electronic money, or the like other than cash. To accept payment by cash, a card, or the like, the payment terminal 400 has a cash feeding port, an automatic change machine, a card reader, or the like. Further, the payment terminal 400 has a display device such as a liquid crystal display, an Organic Light Emitting Diode (OLED) display, or the like for display of payment information or the like.

The product registration apparatus 500 is an apparatus that registers a product to be purchased. An amount to be paid at the payment terminal 400 is automatically calculated in the payment terminal 400 in accordance with a registered product. Further, registered product information is stored in a database of the POS system 10 and used for stock management, calculation of proceeds, or the like. Note that the payment terminal 400 and the product registration apparatus 500 may be an integrated apparatus such as a POS register.

Figure 2:
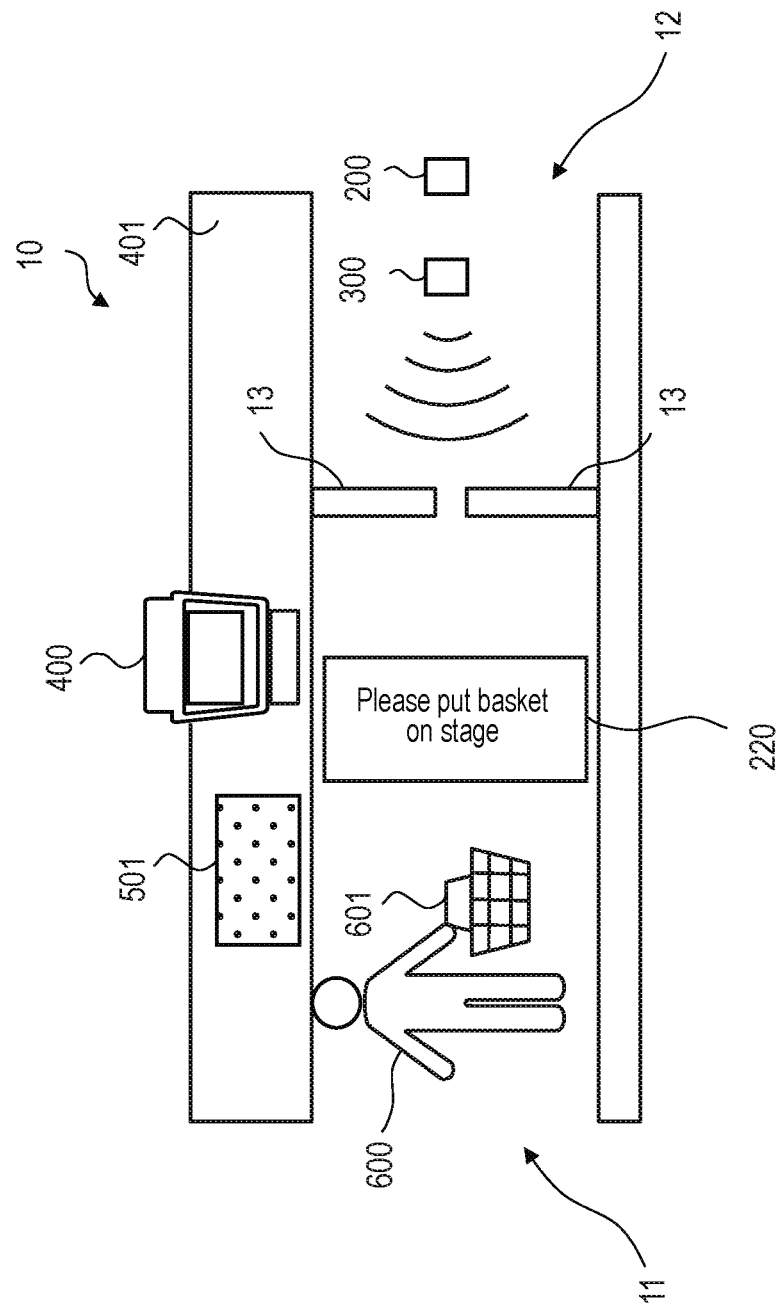
FIG. 2 is a schematic top view illustrating the arrangement in the POS system according to the first example embodiment.

FIG. 2 is a schematic top view illustrating the arrangement of a lane in the POS system 10 according to the present example embodiment. The lane illustrated in FIG. 2 is a self-service type unmanned lane on which a customer 600 performs product registration, payment, or the like by himself/herself. The customer 600 who purchases a product carries a basket 601 loaded with a product and enters the lane from an entrance 11. Once the customer 600 makes payment in the lane, gates 13 are operated to open, and the customer 600 may exit from an exit 12.

The payment terminal 400 is provided on a register stage 401. The register stage 401 forms a payment lane in a shop. Although FIG. 2 illustrates one payment terminal 400 and one register stage 401, each number thereof may be plural.

Further, a wireless communication terminal 501 of the product registration apparatus 500 is provided on the register stage 401. The wireless communication terminal 501 is a wireless communication device such as a sheet-like antenna based on a Radio Frequency Identifier (RFID) technology, for example. Once the customer 600 places the basket 601 on the wireless communication terminal 501, the wireless communication terminal 501 communicates with an integrated circuit (IC) tag attached to a product and thereby acquires identification information on all the products in the basket 601. Accordingly, the product registration apparatus 500 can register a product placed by the customer 600.

Note that, although the basket 601 is illustrated as an example for a form of a carrier by which the customer 600 carries a product, the form is not limited thereto and may be a bag or the like, for example. Further, a carrier may be a cart as with the second example embodiment described later. Further, when the customer 600 holds a product by the hand without using a carrier such as the basket 601, the customer 600 places the product directly on the wireless communication terminal 501 and thereby can cause the wireless communication terminal 501 to acquire identification information on the product.

Herein, the communication coverage area of the wireless communication terminal 501 is limited to a range above the wireless communication terminal 501, and the wireless communication terminal 501 does not communicate with a product outside the communication coverage area. Accordingly, erroneous registration of a product carried by another customer is suppressed.

Note that acquisition of identification information may be performed by using an optical reading device such as a scanner or the like to read a code attached to a package of a product or the like, such as a barcode, a two-dimensionally code, or the like. In such a case, the optical reading device is provided instead of the wireless communication terminal 501 on the register stage 401. The customer 600 may perform product registration by arranging the bringing product on the optical reading device or holding the bringing product above the optical reading device. Also in such a case, a product outside the readable area of the optical reading device is not read. Thus, a product held by another customer is not erroneously registered.

Note that, in the process of acquiring identification information from a product as described above, in the present specification, "product" includes not only a product body but also an article attached to a product, such as a package of a product, a container of a product, a hang tag attached to a product, an IC tag attached to a product, or the like. For example, when an IC tag is embedded in the hang tag tied with a product by a string, a process of reading identification information from the IC tag corresponds to a process of acquiring identification information from a product.

Figure 3:
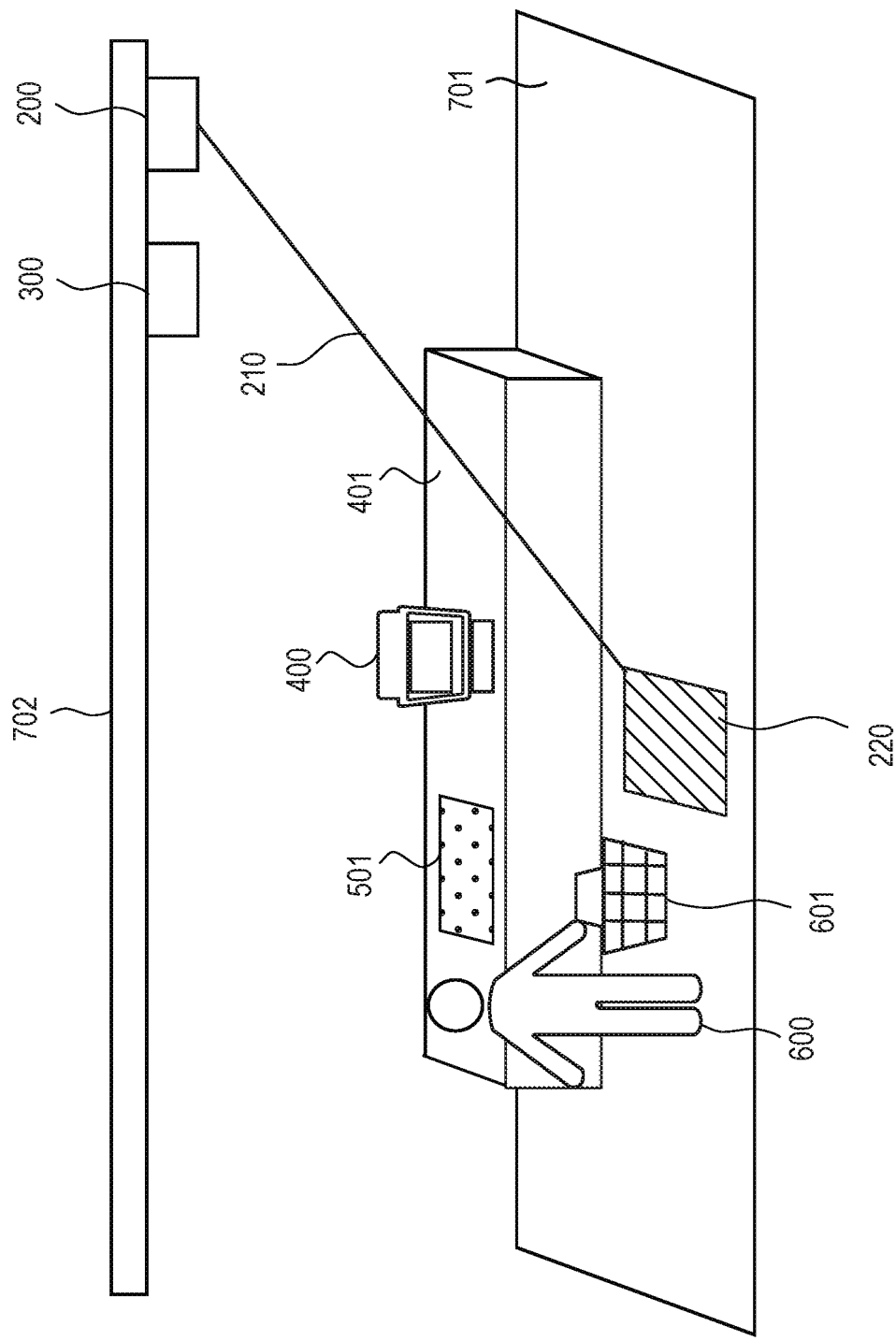
FIG. 3 is a schematic side view illustrating the arrangement in the POS system according to the first example embodiment.

Herein, the configuration of the POS system 10 will be described in more detail with reference to FIG. 3 in addition. FIG. 3 is a schematic side view illustrating the arrangement of the lane in the POS system 10 according to the present example embodiment. Note that, in FIG. 3, illustration of the gate 13 is omitted.

The ranging apparatus 300 is arranged on a ceiling 702 of a shop. The ranging apparatus 300 performs ranging within a predetermined ranging range including the customer 600 present near the wireless communication terminal 501, a carrier such as the basket 601 carried by the customer 600, or a product held by the customer 600. This ranging may be three-dimensional measurement to measure a distance in the depth direction while scanning two directions of the vertical direction and the horizontal directions, for example. In such a case, it is possible to obtain three-dimensional information within a range including a place near the wireless communication terminal 501. Note that, when the ranging apparatus 300 is a LiDAR device, ranging accuracy in the depth direction can be improved compared to a case where a stereo camera or the like is employed. Although the type of a laser light source used for the LiDAR device is not particularly limited, the case where the laser light source is a laser light source that emits invisible light such as an infrared ray is more desirable because the ranging light does not give discomfort to the customer 600. The method of utilizing the information acquired by the ranging apparatus 300 will be described later.

The image projection apparatus 200 is also arranged on the ceiling 702 of the shop in the same manner as the ranging apparatus 300. The image projection apparatus 200 emits a light beam 210 to the floor surface 701 of the shop and thereby displays a projection image 220 on the floor surface 701. The image projection apparatus 200 has a mechanism that can change the orientation of emission of the light beam 210 within a predetermined range. Thereby, the image projection apparatus 200 can display the projection image 220 at a position in accordance with control of the information processing system 100. Note that, to enable the customer 600 to view the projection image 220, it is desirable that visible light be a main component of the light beam 210 emitted from the image projection apparatus 200. The projection image 220 may be an image for notifying the customer 600, as FIG. 2 illustrates "Please put basket on stage" as an example.

Once the product registration apparatus 500 acquires identification information, information such as a product name, a quantity of products, or a payment amount of payment target, a number of credit card or the like that can be used for payment, an operation instruction to the customer 600, or the like is displayed on the display device of the payment terminal 400.

Note that information related to a product of a payment target out of the displayed information can be acquired from a product database in the POS system 10 based on the identification information.

In response to the customer 600 completing payment using the payment terminal 400, the POS system 10 operates to open the gates 13. The customer 600 then carries a paid product and exits from the exit 12.

Figure 4:
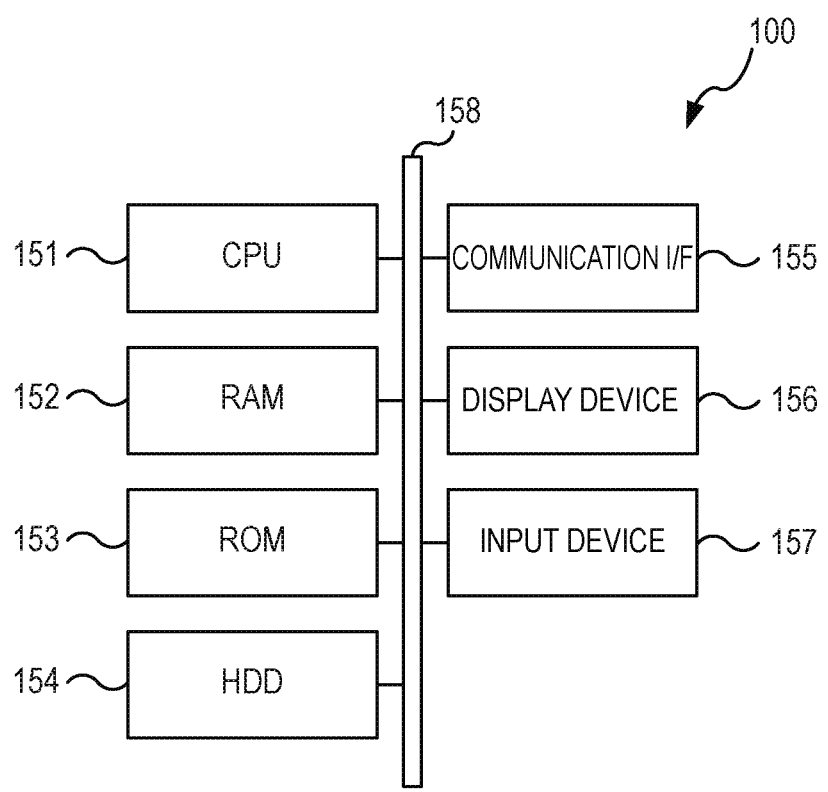
FIG. 4 is a block diagram illustrating a hardware configuration example of an information processing system according to the first example embodiment.

Next, the configuration and the operation of the information processing system 100 will be described. FIG. 4 is a block diagram illustrating an example of a hardware configuration of the information processing system 100. The information processing system 100 may be a computer, for example. The information processing system 100 may be a computer provided inside the image projection apparatus 200, the ranging apparatus 300, the payment terminal 400, or the product registration apparatus 500.

The information processing system 100 has a central processing unit (CPU) 151, a random access memory (RAM) 152, a read only memory (ROM) 153, and a hard disk drive (HDD) 154 as a computer that performs calculation, control, and storage. The information processing system 100 further has a communication interface (I/F) 155, a display device 156, and an input device 157. The CPU 151, the RAM 152, the ROM 153, the HDD 154, the communication I/F 155, the display device 156, and the input device 157 are connected to each other via a bus 158. Note that the display device 156 and the input device 157 may be connected to the bus 158 via a drive device (not illustrated) used for driving these devices.

While respective components forming the information processing system 100 are illustrated as an integrated device in FIG. 4, some of these functions may be provided by an external device. For example, the display device 156 and the input device 157 may be an external device independent of a part forming the function of a computer including the CPU 151 and the like.

The CPU 151 has a function of performing a predetermined operation in accordance with a program stored in the ROM 153, the HDD 154, or the like and also controlling each component of the information processing system 100. The RAM 152 is formed of a volatile storage medium and provides a temporary memory area necessary for the operation of the CPU 151. The ROM 153 is formed of a nonvolatile storage medium and stores necessary information such as a program used for the operation of the information processing system 100. The HDD 154 is a storage device that is formed of a nonvolatile storage medium and stores data required for processing, a program for operating the information processing system 100, or the like.

The communication I/F 155 is a communication interface based on the specification such as Ethernet (registered trademark), Wi-Fi (registered trademark), 4G, or the like, which is a module used for communicating with other devices. The display device 156 is a liquid crystal display, an OLED display, or the like and is used for displaying an image, a text, an interface, or the like. The input device 157 is a keyboard, a pointing device, or the like and is used by the user for operating the information processing system 100. An example of the pointing device may be a mouse, a trackball, a touch panel, or the like. The display device 156 and the input device 157 may be integrally formed as a touch panel.

Note that the hardware configuration illustrated in FIG. 4 is an example, and a device other than the above may be added, or some of the devices may not be provided. Further, some of the devices may be replaced with another device having the same function. Furthermore, a part of the function of the present example embodiment may be provided by another device via a network, or the function of the present example embodiment may be implemented by being distributed in a plurality of devices. For example, the HDD 154 may be replaced with a solid state drive (SSD) using a semiconductor memory or may be replaced with cloud storage.

Figure 5:
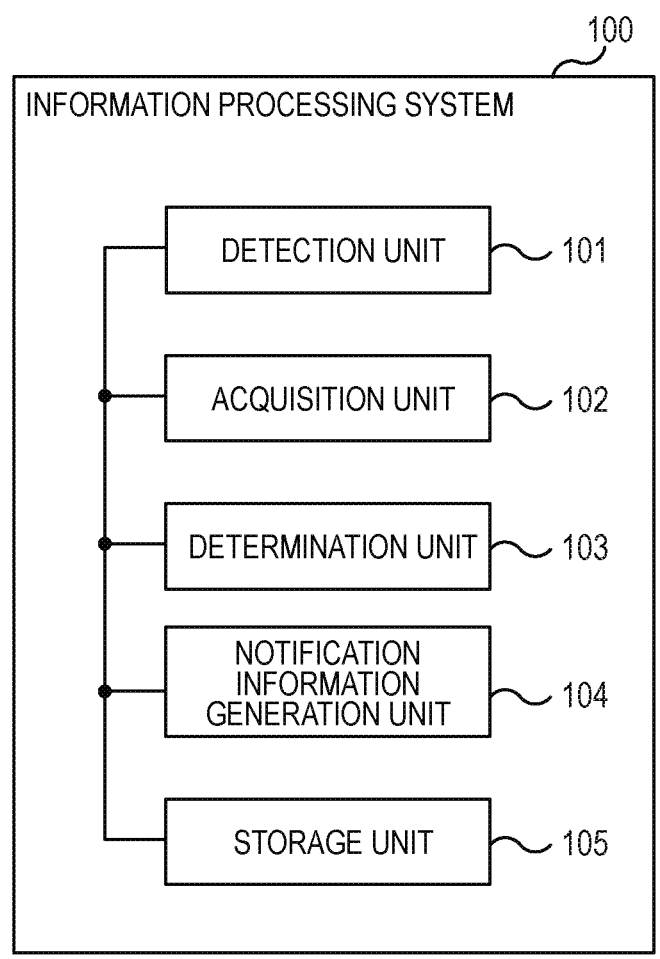
FIG. 5 is a function block diagram of the information processing system according to the first example embodiment.

FIG. 5 is a function block diagram of the information processing system 100 according to the present example embodiment. The information processing system 100 has a detection unit 101, an acquisition unit 102, a determination unit 103, a notification information generation unit 104, and a storage unit 105.

The CPU 151 implements functions of the detection unit 101, the acquisition unit 102, the determination unit 103, and the notification information generation unit 104 by loading a program stored in the ROM 153, the HDD 154, or the like to the RAM 152 and executing the program. Processes performed in these units will be described later. The CPU 151 implements a function of the storage unit 105 by controlling the HDD 154.

FIG. 6 is a flowchart illustrating a process performed by the information processing system 100 according to the present example embodiment. A payment-related process performed by the information processing system 100 will be described with reference to FIG. 6.

In step S101, the information processing system 100 instructs the ranging apparatus 300 to perform ranging within a range including a place near the payment terminal 400. The ranging apparatus 300 performs ranging in response to this instruction. Distance information acquired by this ranging is transmitted to the information processing system 100 and stored in the storage unit 105 if necessary.

Note that the timing when the information processing system 100 instructs the ranging apparatus 300 to perform ranging in step S101 may be the timing when the customer 600 approaches the payment lane. Detection of approach of the customer 600 may be a process of monitoring a place around the payment lane all the time by a camera and detecting a moving object such as the customer 600, the basket 601, a cart, or the like from the image acquired by the camera. Alternatively, a pressure sensor may be installed in a floor around a payment lane, and a process in which the pressure sensor detects the weight of the customer 600, a cart, or the like may be possible. The information processing system 100 instructs the ranging apparatus 300 to perform ranging when approach of the customer 600 is detected by the above scheme.

Further, as another example, the ranging apparatus 300 may monitor a place around a payment lane all the time. In this example, the present process may be performed at the timing when the ranging apparatus 300 detects approach of the customer 600. Further, in this example, the process of step S101 does not include a process in which the information processing system 100 instructs the ranging apparatus 300 to perform ranging and is a process in which the information processing system 100 receives distance information from the ranging apparatus 300.

In step S102, the detection unit 101 detects the position of the customer 600 or a detection target held by the customer 600 based on distance information obtained by the ranging apparatus 300. Herein, the detection target may be, for example, a product or an attachment thereof, such as a product to be purchased by the customer 600, a package of the product, a container of the product, or the like, a carrier that carries a product, such as a cart, the basket 601, or the like used for transferring the product, or the like.

In step S103, based on a result of the position detection performed by the detection unit 101, the determination unit 103 determines whether or not the detected position is a position that enables acquisition of identification information. If the determination unit 103 determines that the detected position is a position that enables acquisition of identification information (step S103, YES), the process proceeds to step S106. In step S103, if the determination unit 103 determines that the detected position is not a position that enables acquisition of identification information (step S103, NO), the process proceeds to step S104. Note that, in step S102, if the position of the customer 600 is detected, it is possible to estimate, from the position of the customer 600, the position of a product or the like where identification information is acquired and perform the process described above as the estimated position being the position of the product. Further, in step S102, if the position of the customer 600 is detected but a carrier such as the basket 601, a cart, or the like is not detected, it is estimated that the customer 600 holds a product by the hand. Thus, it is also possible to perform the process described above as the position of the customer 600 being the position of the product. Furthermore, in step S102, if both the customer 600 and a carrier such as the basket 601, a cart, or the like are detected, it is estimated that a product is included in the carrier. Thus, it is also possible to perform the process described above as the position of the carrier being the position of the product.

The process of step S103 in the example of FIG. 2 and FIG. 3 will be more specifically described. The determination unit 103 determines whether or not a product attached with an IC tag or the basket 601 loaded with a product is within a communication coverage area of the wireless communication terminal 501 based on a result of position detection performed by the detection unit 101. When the basket 601 is placed on the wireless communication terminal 501, since the IC tag and the wireless communication terminal 501 can communicate with each other, the determination unit 103 determines that the detected position is a position that enables acquisition of identification information. When the customer 600 holds the basket 601 by the hand as illustrated in FIG. 2 and FIG. 3, since the IC tag and the wireless communication terminal 501 are unable to communicate with each other, it is determined that the detected position is not a position that enables acquisition of identification information.

In step S104, the notification information generation unit 104 generates notification information used for displaying a notification to the customer 600. This notification information is supplied from the information processing system 100 to the image projection apparatus 200. This notification information may be, for example, data of a notification text included in the projection image 220 described later.

In step S105, the image projection apparatus 200 displays the projection image 220 based on notification information generated by the notification information generation unit 104. It is desirable that a place to display the projection image 220 be a highly visible place to the customer 600, such as the floor surface 701 near the feet of the customer 600, for example. The content of a notification provided by the projection image 220 to the customer 600 may be to urge the customer 600 to move a product or a carrier to a predetermined place. Specifically, as illustrated in FIG. 2, the notification may be to urge the customer 600 to place the basket 601 on the wireless communication terminal 501 of the register stage 401.

After displaying the projection image 220, the process proceeds to step S103. Accordingly, it is possible to detect whether or not the customer 600 has moved a product or a carriage to a position that enables acquisition of identification information.

In step S106, the information processing system 100 controls the payment terminal 400 and the product registration apparatus 500 to enter a state where payment made by the customer 600 can be accepted. Accordingly, the customer 600 is able to start product registration using the product registration apparatus 500 and payment using the payment terminal 400. The acquisition unit 102 acquires the identification information acquired from the IC tag by the wireless communication terminal 501. The identification information is used for product registration, and information on the registered product is used for calculation of a payment amount performed in the payment terminal 400.

According to the present example embodiment, when a product or the like are not at a position that enables acquisition of identification information, it is possible to provide a notification to the customer 600. Accordingly, it is possible to urge the customer 600 to take an action for arranging a product or the like to a suitable position so that identification information can be acquired. Therefore, the information processing system 100 that enables support of acquisition of identification information is provided.

Further, in the present example embodiment, the detection unit 101 determines whether or not the position of a product or the like is a position that enables acquisition of identification information based on information acquired by the ranging apparatus 300 or the like. Accordingly, it is possible to determine whether or not to acquire identification information before the acquisition unit 102 actually attempts acquisition of identification information. It is therefore possible to notify a customer more quickly than a scheme to actually attempt acquisition of identification information and then notify a customer if the acquisition fails. Further, when acquisition of identification information is actually attempted and the acquisition fails, it may be unclear whether the failure is caused by a positional relationship or a factor other than the positional relationship, however, in the present example embodiment, the position of a product or the like are directly acquired, which leads to an advantage that the cause thereof is clear.

Second Example Embodiment

FIG. 7 and FIG. 8 are schematic top view illustrating the arrangement on a lane in the POS system 10 according to the present example embodiment. FIG. 7 and FIG. 8 illustrate that a displayed content of the projection image 221 is different in accordance with the position of a cart 602 held by the customer 600. FIG. 9 is a flowchart illustrating a process performed by the information processing system 100 according to the present example embodiment. The configuration and the process of the present example embodiment will be described with reference to FIG. 7 to FIG. 9. Note that, in the description of the present example embodiment, the description of a part duplicated with the first example embodiment will be omitted or simplified.

The POS system 10 of the present example embodiment is configured to be able to collectively perform product registration on products in the cart 602. Accordingly, the POS system 10 of the present example embodiment can complete payment without requiring products to be unloaded from the cart 602 when the customer 600 uses the cart 602 to carry in the products.

At least one wireless communication terminal 502 adapted to the RFID technology is provided inside the lane. The wireless communication terminal 502 is an antenna device based on the RFID technology, for example. The wireless communication terminal 502 acquires identification information on each product in the cart 602 by wirelessly communicating with each IC tag attached to the products in the cart 602. Accordingly, the product registration apparatus 500 can register products loaded on the cart 602 by the customer 600. A communication coverage region R1 illustrated in FIG. 7 and FIG. 8 indicates a range where IC tags mounted on the cart 602 can be read from any of a plurality of wireless communication terminals 502. In the example of FIG. 7 and FIG. 8, four wireless communication terminals 502 are arranged to form a rectangle in order to secure a readable range corresponding to the shape of the cart 602.

The payment-related process performed by the information processing system 100 will be described with reference to FIG. 9. Since the process of step S101 and step S102 is the same as that in the first example embodiment, the description thereof will be omitted.

In step S103, based on a result of position detection performed by the detection unit 101, the determination unit 103 determines whether or not the detected position is a position that enables acquisition of identification information. If the determination unit 103 determines that the detected position is a position that enables acquisition of identification information (step S103, YES), the process proceeds to step S107. In step S103, if the determination unit 103 determines that the detected position is not a position that enables acquisition of identification information (step S103, NO), the process proceeds to step S104.

The process of step S103 in the example of FIG. 7 and FIG. 8 will be more specifically described. The determination unit 103 determines whether or not the cart 602 loaded with a product to which an IC tag is attached is in the communication coverage region R1 of the wireless communication terminals 502 based on a result of position detection performed by the detection unit 101. If the cart 602 is not inside the communication coverage region R1 as illustrated in FIG. 7, since the IC tag and the wireless communication terminal 502 are unable to communicate with each other, the determination unit 103 determines that the detected position is not a position that enables acquisition of identification information. If the cart 602 is inside the communication coverage region R1 as illustrated in FIG. 8, since the IC tag and the wireless communication terminal 502 are able to communicate with each other, the determination unit 103 determines that the detected position is a position that enables acquisition of identification information.

In step S104, the notification information generation unit 104 generates notification information used for displaying a notification to the customer 600. This notification information is supplied from the information processing system 100 to the image projection apparatus 200. In step S105, the image projection apparatus 200 displays the projection image 221 based on the notification information generated by the notification information generation unit 104.

The content of the notification to the customer 600 provided by the projection image 221 may be to urge the customer 600 to move the cart 602 to the inside of the communication coverage region R1, as FIG. 7 illustrates "A little more forward, please" as an example.

After displaying the projection image 221, the process proceeds to step S103. Accordingly, it is possible to detect whether or not the customer 600 has moved a product or a carrier to a position that enables acquisition of identification information.

In step S107, the notification information generation unit 104 generates notification information used for displaying a notification to the customer 600. This notification information is supplied from the information processing system 100 to the image projection apparatus 200. In step S108, the image projection apparatus 200 displays the projection image 222 based on the notification information generated by the notification information generation unit 104.

The content of the notification to the customer 600 provided by the projection image 222 may be different from that provided by the projection image 221 described above. Specifically, the content may be to ask the customer 600 to maintain the position of the cart 602 inside the communication coverage region R1, as FIG. 8 illustrates "Stop" as an example.

Note that the process of step S107 and step S108 may be omitted.

After displaying the projection image 222, the process proceeds to step S106. Since the process of step S106 is the same as that in the first example embodiment, the description thereof will be omitted.

According to the present example embodiment, in the same manner as the first example embodiment, the information processing system 100 that enables support of acquisition of identification information is provided. Further, convenience for the customer 600 carrying in a product by using the cart 602 is improved.

The system described in the above example embodiment can also be configured as the following third example embodiment.

Third Example Embodiment

FIG. 10 is a function block diagram of an information processing system 800 according to the third example embodiment. The information processing system 800 has a detection unit 801, an acquisition unit 802, a determination unit 803, and a notification information generation unit 804. The detection unit 801 detects a position of a customer, a product, or a carrier used for carrying a product. The acquisition unit 802 acquires identification information from the product. The determination unit 803 determines whether or not the position detected by the detection unit is a position that enables acquisition of the identification information. The notification information generation unit 804 generates notification information used for providing a notification to the customer if it is determined that the position detected by the detection unit is not a position that enables acquisition of the identification information.

According to the present example embodiment, the information processing system 800 that can support acquisition of identification information is provided.

Modified Example Embodiment

The present invention is not limited to the example embodiments described above and can be changed as appropriate without departing from the spirit of the present invention.

In the example embodiments described above, the ranging apparatus 300 may be replaced with an apparatus that does not perform ranging, such as a still camera, a video camera, or the like. In such a case, it is possible to calculate a distance between the payment terminal 400 and an approaching person from a captured image by using various image analysis technologies and perform the same process based on the calculated distance. However, it is more desirable to employ the ranging apparatus 300 that can directly measure a distance.

Further, in the example embodiments described above, the means that provides a notification is not limited to the image projection apparatus 200. For example, a notification may be displayed on a display device provided to the payment terminal 400 or the like, or a speaker provided to the payment terminal 400 or the like may be used to provide a notification by a voice.

Further, in the example embodiments described above, each content of the notification provided by the projection images 220, 221, and 222 is not limited to a content of a sentence and may be a non-language content such as a figure, a symbol, a picture, or the like. For example, display indicating a place to put the basket 601 or the like may be provided with an arrow or the like.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an application specific integrated circuit (ASIC), a field programmable gate array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

Note that all the example embodiments described above are mere embodied examples in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

An information processing system comprising:

a detection means for detecting a position of a customer, a product, or a carrier used for carrying the product;

an acquisition means for acquiring identification information from the product;

a determination means for determining whether or not a position detected by the detection means is a position that enables acquisition of the identification information; and a notification information generation means for, when it is determined that the position detected by the detection means is not a position that enables acquisition of the identification information, generating notification information used for providing a notification to the customer.

(Supplementary Note 2)

The information processing system according to supplementary note 1, wherein the notification is for urging the customer to move the product or the carrier to a predetermined place.

(Supplementary Note 3)

The information processing system according to supplementary note 1 or 2, wherein the identification information is information used when the customer performs product registration.

(Supplementary Note 4)

The information processing system according to any one of supplementary notes 1 to 3, wherein the acquisition means acquires the identification information read from the product by an optical reading device.

(Supplementary Note 5)

The information processing system according to supplementary note 4, wherein the determination means performs determination based on whether or not the position detected by the detection means is inside a readable range of the optical reading device.

(Supplementary Note 6)

The information processing system according to any one of supplementary notes 1 to 3, wherein the acquisition means acquires the identification information read by a wireless communication device from a storage medium included in the product.

(Supplementary Note 7)

The information processing system according to supplementary note 6, wherein the determination means performs determination based on whether or not the position detected by the detection means is inside a communication coverage area of the wireless communication device.

(Supplementary Note 8)

The information processing system according to any one of supplementary notes 1 to 7, wherein the detection means detects the position of the customer, the product, or the carrier based on distance information acquired by a ranging apparatus that acquires a distance to a ranging target.

(Supplementary Note 9)

The information processing system according to supplementary note 8, wherein the ranging apparatus includes a Light Detection and Ranging (LiDAR) device.

(Supplementary Note 10)

The information processing system according to supplementary note 9, wherein the LiDAR device includes a laser light source that emits invisible light.

(Supplementary Note 11)

The information processing system according to any one of supplementary notes 1 to 10, wherein the notification information is supplied to an image projection apparatus that displays an image including the notification by emitting visible light.

(Supplementary Note 12)

The information processing system according to supplementary note 11, wherein the image projection apparatus displays the image on a floor surface of a shop.

(Supplementary Note 13)

The information processing system according to supplementary note 12, wherein the image projection apparatus displays the image near the customer.

(Supplementary Note 14)

The information processing system according to any one of supplementary notes 1 to 13, wherein the detection means detects a position of at least one of the customer, a product to be purchased by the customer, a package of the product, a container of the product, a cart used for transferring the product, and a basket used for transferring the product.

(Supplementary Note 15)

An information processing method comprising:

detecting a position of a customer, a product, or a carrier used for carrying the product;

acquiring identification information from the product;

determining whether or not the detected position is a position that enables acquisition of the identification information; and when it is determined that the detected position is not a position that enables acquisition of the identification information, generating notification information used for providing a notification to the customer.

(Supplementary Note 16)

A storage medium storing a program that causes a computer to perform:

detecting a position of a customer, a product, or a carrier used for carrying the product;

acquiring identification information from the product;

determining whether or not the detected position is a position that enables acquisition of the identification information; and when it is determined that the detected position is not a position that enables acquisition of the identification information, generating notification information used for providing a notification to the customer.

This application is based upon and claims the benefit of priority from Japanese Patent Application No. 2018-055052, filed on Mar. 22, 2018, the disclosure of which is incorporated herein in its entirety by reference.

REFERENCE SIGNS LIST

10 POS system
11 entrance
12 exit
13 gate
100, 800 information processing system
101, 801 detection unit
102, 802 acquisition unit
103, 803 determination unit
104, 804 notification information generation unit
105 storage unit
151 CPU
152 RAM
153 ROM
154 HDD
155 communication I/F
156 display device
157 input device
158 bus
200 image projection apparatus
210 light beam
220, 221, 222 projection image
300 ranging apparatus
400 payment terminal
401 register stage
500 product registration apparatus
501, 502 wireless communication terminal
600 customer
601 basket
602 cart
701 floor surface
702 ceiling
R1 communication coverage region

What is claimed is:

1. An information processing system comprising:
a memory configured to store instructions: and
a processor configured to execute the instructions to:
acquire identification information from a product;
before the identification information is acquired from the product, detect a position of a customer, the product, or a carrier used for carrying the product;
determine whether or not the detected position is a position that enables acquisition of the identification information; and
when it is determined that the detected position is not a position that enables acquisition of the identification information, generate notification information used for providing a notification to the customer,
wherein the position of the customer, the product, or the carrier used for carrying the product is detected at a timing when the customer approaches a payment lane.

2. The information processing system according to claim 1, wherein the notification is for urging the customer to move the product or the carrier to a predetermined place.

3. The information processing system according to claim 1, wherein the identification information is information used when the customer performs product registration.

4. The information processing system according to claim 1, wherein the processor is further configured to execute the instructions to acquire the identification information read from the product by an optical reading device.

5. The information processing system according to claim 4, wherein the processor is further configured to execute the instructions to determine whether or not the detected position is the position that enables acquisition of the identification information based on whether or not the detected position is inside a readable range of the optical reading device.

6. The information processing system according to claim 1, wherein the processor is further configured to execute the instructions to acquire the identification information read by a wireless communication device from a storage medium included in the product.

7. The information processing system according to claim 6, wherein the processor is further configured to execute the instructions to determine whether or not the detected position is the position that enables acquisition of the identification information based on whether or not the detected position is inside a communication coverage area of the wireless communication device.

8. The information processing system according to claim 1, wherein the processor is further configured to execute the instructions to detect the position of the customer, the product, or the carrier based on distance information acquired by a ranging apparatus that acquires a distance to a ranging target.

9. The information processing system according to claim 8, wherein the ranging apparatus includes a Light Detection and Ranging (LiDAR) device.

10. The information processing system according to claim 9, wherein the LiDAR device includes a laser light source that emits invisible light.

11. The information processing system according to claim 1, wherein the notification information is supplied to an image projection apparatus that displays an image including the notification by emitting visible light.

12. The information processing system according to claim 11, wherein the image projection apparatus displays the image on a floor surface of a shop.

13. The information processing system according to claim 12, wherein the image projection apparatus displays the image near the customer.

14. The information processing system according to claim 1, wherein the processor is further configured to execute the instructions to detect a position of at least one of the customer, a product to be purchased by the customer, a package of the product, a container of the product, a cart used for transferring the product, and a basket used for transferring the product.

15. The information processing system according to claim 1, wherein the position of the customer or the carrier used for carrying the product is detected.

16. The information processing system according to claim 1, wherein, when both of the position of the customer and the position of the carrier used for carrying the product are capable of being detected, the position of the carrier used for carrying the product is detected.

17. The information processing system according to claim 1, wherein the position of the customer in a store, the product in the store, or the carrier used for carrying the product in the store is detected.

18. An information processing method comprising:

acquiring identification information from a product;

before the identification information is acquired from the product, detecting a position of a customer, the product, or a carrier used for carrying the product;

determining whether or not the detected position is a position that enables acquisition of the identification information; and when it is determined that the detected position is not a position that enables acquisition of the identification information, generating notification information used for providing a notification to the customer, wherein the position of the customer, the product, or the carrier used for carrying the product is detected at a timing when the customer approaches a payment lane.

19. A non-transitory storage medium storing a program that causes a computer to perform:

acquiring identification information from a product;

before the identification information is acquired from the product, detecting a position of a customer, the product, or a carrier used for carrying the product;

determining whether or not the detected position is a position that enables acquisition of the identification information; and when it is determined that the detected position is not a position that enables acquisition of the identification information, generating notification information used for providing a notification to the customer, wherein the position of the customer, the product, or the carrier used for carrying the product is detected at a timing when the customer approaches a payment lane.

* * * * *